United States Patent [19]

Hartness

[11] 4,302,919
[45] Dec. 1, 1981

[54] CASE CENTERING DEVICE

[75] Inventor: Thomas S. Hartness, Greenville, S.C.

[73] Assignee: Hartness International, Inc., Greenville, S.C.

[21] Appl. No.: 23,166

[22] Filed: Mar. 23, 1979

[51] Int. Cl.³ ............................................. B65B 21/18
[52] U.S. Cl. ........................................ 53/250; 53/539; 198/345
[58] Field of Search ................ 53/247, 249, 250, 539; 198/345; 269/34, 218

[56] References Cited

U.S. PATENT DOCUMENTS

| 1,937,303 | 11/1933 | Worrall | 198/345 X |
| 2,679,748 | 6/1954 | Kent | 198/345 X |
| 2,712,405 | 7/1955 | Rockcastle | 53/539 |
| 2,713,448 | 7/1955 | Wimmer | 53/247 |
| 2,799,414 | 7/1957 | Streckfuss | 414/416 |
| 2,894,262 | 7/1959 | Schafpoth | 198/345 X |
| 2,952,955 | 9/1960 | Leichenich | 53/61 |
| 2,957,287 | 10/1960 | Cella | 53/250 X |
| 3,353,331 | 11/1967 | Rowekamp | 53/249 X |
| 3,355,856 | 12/1967 | Randrup | 198/345 X |
| 3,410,046 | 11/1968 | Johnson | 53/247 X |
| 3,593,489 | 7/1971 | Roth | 53/250 |
| 3,986,321 | 10/1976 | Hartness | 53/64 |

FOREIGN PATENT DOCUMENTS 1058933 6/1959 Fed. Rep. of Germany ...... 198/345

Primary Examiner—John Sipos
Attorney, Agent, or Firm—Bailey, Dority & Flint

[57] ABSTRACT

A device for centering cases into which articles such as bottles are deposited from an article loading machine. The case into which the articles are to be deposited are fed by a conveyor to a position below a grid set upon which the articles are carried. The case is shifted longitudinally and laterally by means of movable arms to a centered position directly below the articles so that the articles are properly positioned for loading into the case. In one embodiment, the movable arms are connected as tongs which engage the front and rear edges of the case when shifting the case to the centered position. In another embodiment, the arms are in the form of space plates that are carried on spring loaded linkages that are positioned an equal distance from a centered position in alignment with the article loading machine. In a third embodiment, arms having inclined surfaces adjacent the ends thereof are manipulated by a power operated cylinder for shifting the case to the centered position. The devices are provided for centering cases of varying lengths being fed to the article loading machine in sequence.

5 Claims, 6 Drawing Figures

CASE CENTERING DEVICE

BACKGROUND OF THE INVENTION

Heretofore, in loading a plurality of articles such as bottles into a case, the case was fed beneath a grid set to a substantially centered position, and the grid set was shifted to drop the bottles into the case. In one particular bottle loading machine, such as disclosed in U.S. Pat. No. 3,986,321, stops were selectively raised and lowered into the path of the incoming conveyor for stopping the case on an elevator at a predetermined position. While these stops work satisfactorily when all of the cases being fed to the case loader were of the same size, problems developed however when different length cases were fed to be loaded. This resulted in the case not being properly centered relative to the grid set which carried the bottles that were to be deposited in the case. For example, cases manufactured of plastic frequently have a thicker front and rear wall as compared to cases manufactured of wood. Such, in turn, would of course make the overall length of the cases different so that if the front edges of the cases were stopped at a predetermined point, the center of the cases would not necessarily be at the same location or properly centered relative to the grid set.

In U.S. Pat. No. 2,952,955, there is disclosed a bottle packaging machine wherein the cases are fed from the side by means of a power operated cylinder pushing the case from a conveyor onto an elevator. While this package machine may operate satisfactorily when all of the cases are of the same length, it would have problems when the cases were of varying lengths.

Other types of article handling devices are disclosed in U.S. Pat. Nos. 4,078,361, 2,799,414, and 3,788,034.

Cases have also been stopped relative to grid set by selectively engaging and disengaging a clutch that is operably connected to the drive for the conveyor feeding the cases to the article handling machine. Such would also have the same problem discussed above when cases of different lengths were utilized. Furthermore, when cases are being fed to the case loader at high speeds, 35-40 cases per minute, the inertia of the incoming cases makes it difficult to stop each case at the same centered position.

Another reason that it is important that the cases be centered relative to the case loading machine is that the thickness of the partitions within the cases vary. If the cases are not properly centered, the articles being deposited therein strike the tops of the partitions causing a malfunction.

SUMMARY OF THE INVENTION

The invention includes an apparatus for centering an empty case below an article handling device such as a case packer for being loaded with articles carried in a predetermined position such as in a grid set. Means, such as a conveyor, is provided for feeding the case to a first position below the article loading device. Means is provided for engaging the case and shifting the case from the first position to a centered position wherein the center of the case is in vertical alignment with the center of the article loading device. Thus, cases of different lengths are properly positioned or centered relative to the article loading machine. In one particular embodiment, the means engaging the case for shifting the case from the first position to a centered position includes a powered operated pair of tongs that have inclined surfaces on the remote ends thereof. These inclined surfaces engage the front and rear surface of the case and shift the case laterally as well as longitudinally to the centered position. In another embodiment, a power operated cylinder is used for moving a pair of arms which have inclined surfaces on the outer ends thereof into engagement with the case for shifting the case both laterally and longitudinally for center alignment.

In still another embodiment of the invention, the means for shifting the case includes a pair of arms that are spaced relative to each other. These arms or guide plates are resiliently biased and mounted on linkages so that they are spaced equally from a desired centered position. As a result, regardless of the length of the case, the arms or guide surfaces will be moved together for holding and centering a case on a platform such as an elevator directly beneath an article loading machine such as a case packer.

Accordingly, it is an object of the present invention to provide an apparatus for centering cases below an article handling device regardless of the length of the case.

Another important object of the present invention is to provide an apparatus which will center empty cases of varying lengths that are being fed in succession to an article loading machine relative to a grid set through which the articles are to be deposited into the case.

Still another important object of the present invention is to provide a relatively simple and accurate device for centering cases relative to article loading machines.

These and other objects and advantages will become apparent upon reference to the following specification, attendant claims and drawings.

DESCRIPTION OF THE PREFERRED EMBODIMENT

Figure 1:
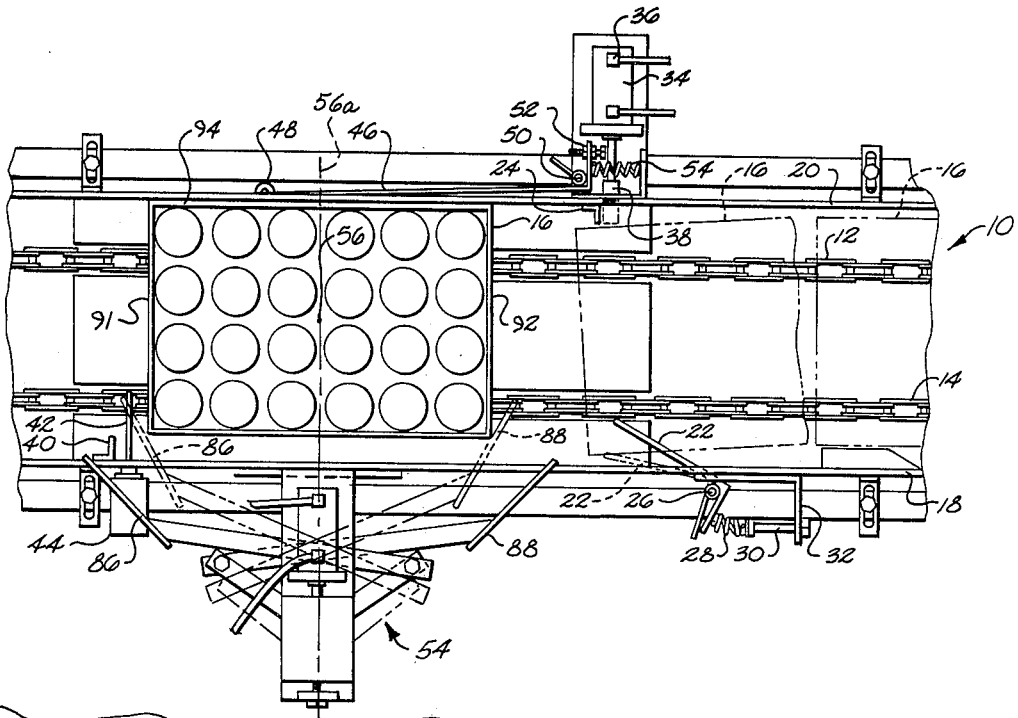
FIG. 1 is a plan view illustrating a case centering device mounted on an article handling machine and, in particular, on a conveyor forming part of the article handling machine.

Referring in more detail to FIG. 1, there is illustrated a means generally designated by the reference character 10 for feeding cases of different lengths to an article loading machine. The means includes a pair of space driven conveyor chains 12 and 14 upon which cases 16 that are to be loaded with articles such as bottles are fed to the article loading machine.

The article loading machine may be any conventional article loading machine such as case packers or bottle unloading machines. Cases are fed on the conveyor chains between a pair of laterally spaced guide rails 18 and 20. As cases are fed from right to left, they first engage a spring-loaded lever 22. The spring-loaded lever forces the case against the side rail 20 so that it strikes an abutment 24 in the form of an angle iron. The abutment 24 stops the case while the chains continue running.

The spring-loaded lever 22 is in the form of an L-shaped bracket that is pivoted on a vertically extending post 26. A spring 28 carried on the end of a rod 30 that is in turn secured to angle member 32 pushes against a shoulder of the bracket 22 forcing it towards the center of the run of the conveyor.

When it is desired to shift the case from the arrested position against the abutment 24 forward on the conveyor to a position below the article loading machine, a power operated cylinder 34 is activated. The power operated cylinder 34 may be any cylinder such as a pneumatic cylinder and when air is supplied to its rear port 36, a plunger 38 carried on the end of a piston rod forming part of the cylinder engages the side of the case moving the case out beyond the abutment 24 as shown in phantom lines. As the case is shifted, the spring-loaded bracket 22 is pushed back to the retracted position such as shown in phantom lines. The conveyor chains then move the case forward until it strikes another abutment 40 carried on the side guide wall 18. Immediately prior to striking the abutment 40, which is also in the form of angle iron, it engages a probe 42 forming part of a switch for activating a switch 44. The switch 44 is used for activating the case centering apparatus.

In order to ensure that the case rides along the side wall 18 so as to strike the abutment 40, a spring-loaded lever 46 engages the opposite side of the case forcing it against the walls 18. The lever 46 has a roller 48 provided adjacent the forward end thereof which engages the case.

Figure 2:
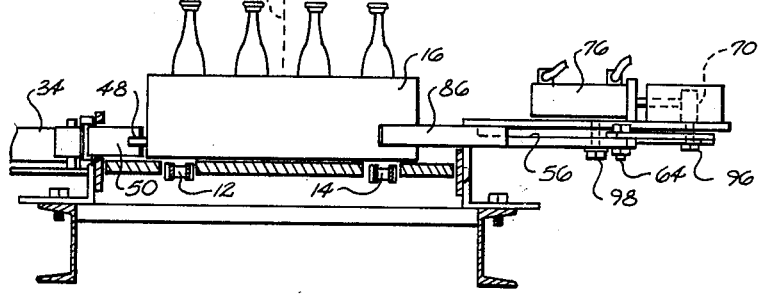
FIG. 2 is an end view illustrating the case centering device of FIG. 1 with a grid set forming part of the article handling machine positioned thereabove.

The lever 46 is carried on a vertical post 50 and has an outwardly extending flange 52. A spring 54 presses against the flange 52 forcing the other end of the lever into the path of the side wall of a case being shifted on the conveyor. After the case has been brought to rest adjacent the abutment 40 in a first position below the article loading machine, it is necessary that the case be shifted laterally and longitudinally so that it is in vertical alignment with the articles carried in the article loading device positioned thereabove. As seen in FIGS. 1 and 2, the center vertical axis of the article loading device is indicated by reference chracter 56.

Figure 3:
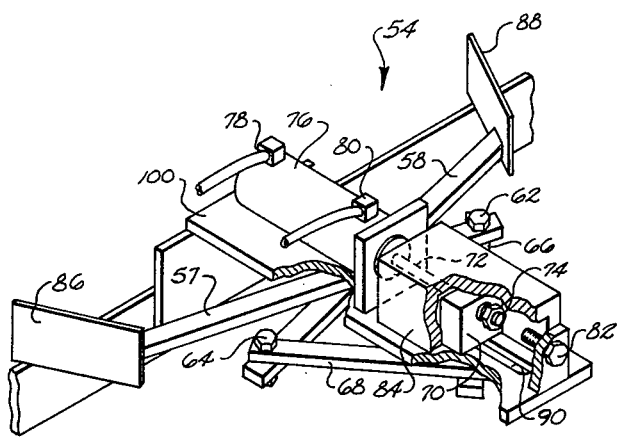
FIG. 3 is an enlarged perspective view of the case centering device shown in FIGS. 1 and 2.

The means engaging the case and shifting the case from the first position adjacent the abutment 40 to a centered position when the center of the case is in vertical alignment with the center of the article loading device is generally designated by the reference character 54 and is shown in perspective view in FIG. 3. The means includes a pair of arms 57 and 58 which have their inner ends joined by pivotal connections by means of bolts 62 and 64 to linkage arms 66 and 68. The inner end of the linkage arms are pivotally connected by a bolt (not shown) to a movable block 70. The movable block 70 is in turn connected to an end of a piston rod 72 by means of bolts 74. The piston rod 72 is connected to the piston carried within a pneumatic cylinder 76. The pneumatic cylinder 76 is a double acting cylinder so that when pressurized air is applied to the lower port 78, it causes the piston rod to be forced outwardly, and wherein when pressurized air is supplied to the inner port 80, the piston rod is retracted.

The pair of arms 57 and 58 extend outwardly from a phantom line 56a which is in alignment with the desired longitudinal center of the case 16.

An adjustable bolt 82 is carried on the end of a housing 84 in which the block 70 travels for limiting the stroke of the piston rod. The bolt 82 can be adjusted for varying the length extending within the housing. The end of the piston rod strikes the bolt 82 for limiting its stroke.

Positioned on the outer ends of the arm 57 and 58 are inclined plates 86 and 88, respectively. The surfaces 86 and 88 or plates are inclined to the vertical axis 56 and extend out beyond the forward wall 91 and rear wall 92 of the case 16. As can be seen, the forward wall 91 and rear wall 92 of the case are joined by side walls 94.

When the case 16 is in the first position flush against the abutment 40, if the power operated cylinder is activated by supplying pressurized air to the inlet port 78, it causes the tongs forming part of the case centering device to be closed. As the tongs close, the inclined surfaces 86 and 88 engage the corners adjacent the forward and rear wall 91 and 92, respectively, of the case, shifting the case laterally and longitudinally. The case is shifted so that it is in perfect longitudinal alignment with the axis 56. This is regardless of the length of the case; and as a result, cases which may vary as much as 1" or more in length can be centered.

Heretofore, when an abutment was used for engaging a front wall of the case, if the cases being fed to the article loading machine varied in length as much as 1", then the center of the case would be at a different location for the different size cases. This would present a problem in loading the articles in the case since the articles or bottles could possibly strike the partitions or walls of the case when being deposited therein.

The housing 84 in which the block 70 is reciprocated back and forth by the pneumatic cylinder 76 has an elongated slot 90 provided in the bottom thereof through which a bolt 96 which passes through the ends of the arm 66 and 68 pivotally secures the arms to the block 70. Another bolt 98 extends through the arms 57 and 58 into the bottom of a plate 100 upon which the cylinder 76 is carried and acts as a pivot joint for the arms 57 and 58 of the tongs.

As can be seen in FIG. 2, a grid set generally designated by the reference character 102 is positioned directly over the case 16 after it has been centered with the center of a case being in alignment with the center represented by the dotted line 56 of the grid set.

The grid set 102 is a conventional grid set and is illustrated schematically solely for the purpose of showing the cooperation between the centering device and the article loading machine. In U.S. Pat. No. 3,788,034, there is a more detailed showing of a grid set.

Figure 4:
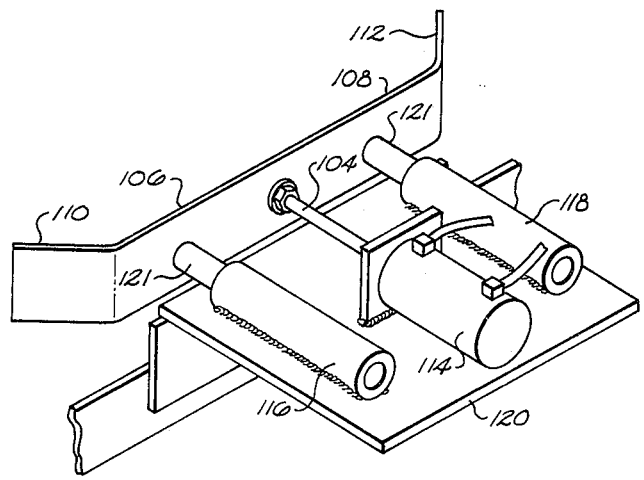
FIG. 4 is a perspective view of a modified form of the invention showing a case centering device which can be utilized in place of the centering device of FIG. 1.

In FIG. 4, there is illustrated a modified form of the invention in that instead of using tongs for shifting the case from the first position to the centered position, a piston operated device is substituted therefor. In FIG. 4, carried on the end of a movable piston rod 104 is a pair of arms 106 and 108 which have inclined surfaces 110 and 112, respectively, carried on the ends thereof. The piston rod 104 in turn extends within a pneumatic cylinder 114 which operates in the same manner as the pneumatic cylinder 76. Guide members 116 and 118 are carried on a plate 120 for aiding in guiding the arms 106 and 108 as they are moved to and fro by operation of the cylinder 114. Each of the guides includes a rod 121 which is attached to one of the arms 106 and 108 and extends within a sleeve. As the piston 104 is extended and retracted, the rods 121 are guided into the sleeve forming part of the guides 116 and 118.

In operation, the centering device illustrated in FIG. 4 is positioned in the same position as the tongs 54 of FIGS. 1 through 3. When the cylinder 114 is activated by the switch 42, the piston rod 104 is extended causing the inclined surfaces 110 and 112 to engage the front and rear walls of the case forcing the case laterally and longitudinally so that it comes in alignment with the center axis 56 of the grid set positioned thereabove.

Figure 5:
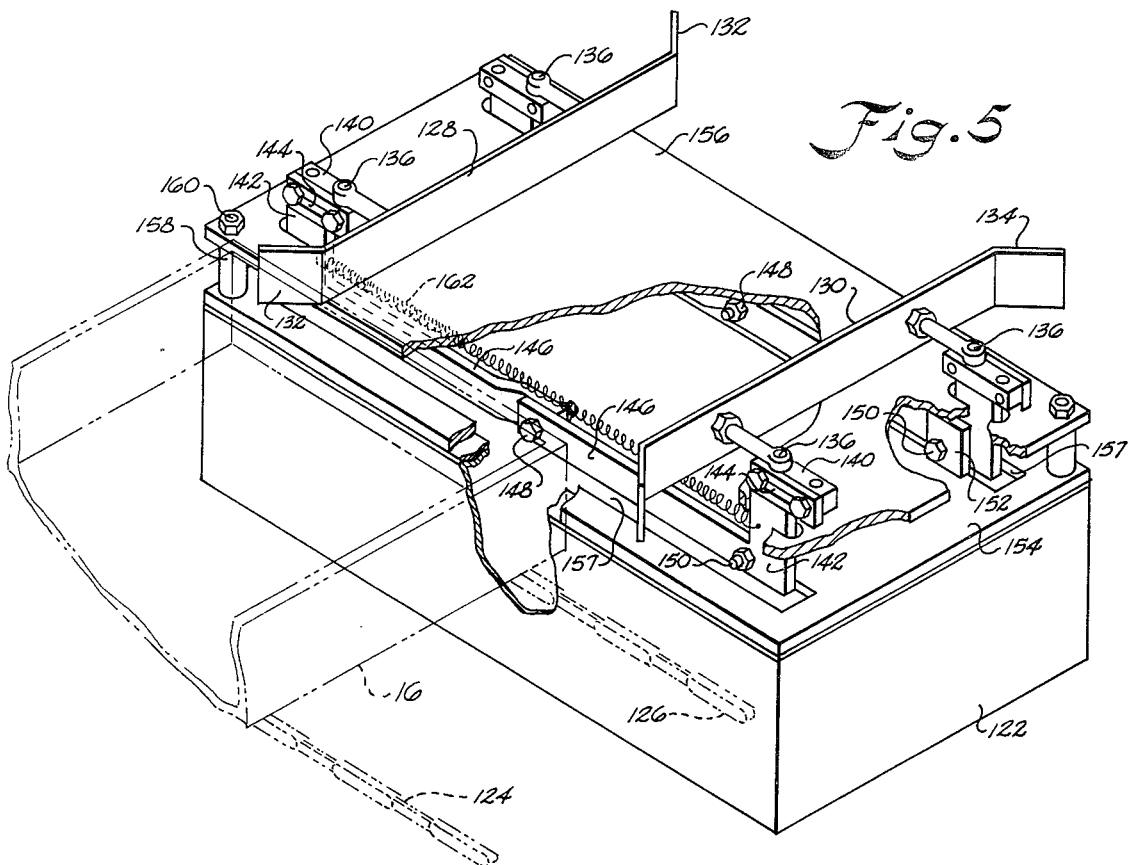
FIG. 5 is a perspective view illustrating still another case centering device mounted on an elevator forming part of a case loading machine.

In FIG. 5, there is disclosed still another modified form of the invention. As shown in FIG. 5, a case 16 is fed adjacent the side of an elevator 122 which forms part of a conventional case loading apparatus. The elevator 122 is raised by conventional means (not shown) such as a linkage arm or fluid operated cylinders from a lowered position to a raised position for receiving articles such as bottles from a bottle loading machine.

The case, as previously mentioned, is fed on a pair of conveyor chains 124 and 126 adjacent the side of the elevator 122. Any suitable wiper arm is used for shifting the case laterally from the conveyor onto the elevator 122.

The elevator 122 is centered relative to the grid set which is positioned directly thereabove through which the articles that are to be loaded into the case are carried. The means for centering the case and shifting the case on the elevator platform includes a pair of spaced arms which are in the form of guide plates 128 and 130, respectively. Positioned on the outer ends of the arms 128 and 130 are inclined surfaces 132 and 134, respectively. The arms or guide plates 128 are in turn supported through ball joints 136 on top of a block 140. The block 140 is laterally adjustably secured to a vertically extending member 142. As is noted, a slot 144 is provided in the upper end of the vertical member 142 so that the block 140 can be shifted laterally relative thereto.

The ball joint 136 permits the plate to pivot vertically and horizontally so that it is maintained in a substantially vertical position for engaging the side or end walls of a case being fed onto the platform.

The vertical extending member 142 forms part of a linkage arm and is integral with a horizontally extending member 146. The inner ends of the horizontally extending members 146 are pivotally joined by means of a bolt 148 extending therethrough. Like reference numerals are utilized for common portions of the linkage means since their function is the same.

Horizontally extending bolts 150 are used for pivotally connecting the horizontal members 146 to vertical standards 152 that are, in turn, bolted to the side wall of the elevator 122 and carried therewith.

The elevator platform has a horizontal top surface 154 which has elongated slots 157 provided therein through which the vertical bracket 152 extends and for allowing the linkage arms freedom of movement. Spaced above the top 154 is a support plate 156 which is secured to the plate 154 through corner posts 158 which have bolts 160 extending therethrough upon which nuts are carried. A pair of elongated springs 162 extend between the vertically extending members 142 of opposed linkage arms for resiliently pulling the guide plates 128 and 130 together.

Figure 6:
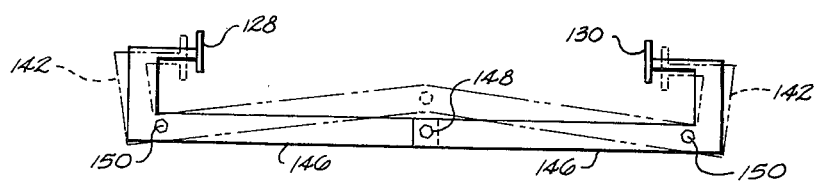
FIG. 6 is a diagrammatic view illustrating the various positions of the arms or guide plates used in the case centering device illustrated in FIG. 5.

When a case is shifted from the conveyor onto the elevator platform 122, the end walls of the case first strike the inclined surfaces 132 and 134. This causes the forward portion of the guide plates 128 and 130 to be spread apart as the case is fed onto the platform. The case is moved laterally relative to the elevator a predetermined distance. If the case is not longitudinally centered when being fed on to the elevator 122, since the plates 128 and 130 are equal distance from the longitudinal center of the elevator, the plates shift the case so that it is centered longitudinally. The springs 162 maintain pressure on the ends of the case for shifting the case on the upper surface 156 of the elevator. If the case is a large case, then the guide plates 128 and 130 would pivot outwardly to the dotted line position such as shown in FIG. 6. However, since the plates are mounted on ball joints 136 on top of the blocks 140, the guide plates 128 and 130 always are maintained flush against the end walls of the case.

If, however, the case is slightly smaller, then the guide arms would not be spread quite as far; and, for example, be spread to the position shown in full lines in FIG. 6. As a result, regardless of the length of the case, the center of the case is always maintained in alignment with the center of the elevator 122 which, of course, is in alignment with the center of the grid set forming part of the article loading machine carried thereabove.

Furthermore, since the leading and trailing edges of the guide plates 128 and 134 are independently mounted, the forward end of the guide plate can be spread a different amount from the trailing end so that if a larger case follows a smaller case, the forward edges of the guide plates 128 and 134 will be pressing against the larger case while the following end of the guide plates press against the case being ejected from the elevator 122. The distance that the case is fed onto the elevator is controlled by the mechanism that is used for pushing the case thereon. One such mechanism is illustrated in U.S. Pat. No. 2,952,955 and includes a power operated cylinder.

As can be seen from all three of the embodiments shown, the centering device will center cases being fed in a line of different lengths without making any adjustments. This is very important with the advent of various style and shape cases.

While a preferred embodiment of the invention has been described using specific terms, such description is for illustrative purposes only, and it is to be understood that changes and variations may be made without departing from the spirit or scope of the following claims.

What is claimed is:

1. An apparatus for centering an empty case having front, rear and side walls below an article loading device for being loaded with articles carried in a predetermined position on said article loading device comprising:

means for feeding said case forwardly with said front wall facing forward to a first position below said article loading device, a pair of spaced inclined means carried adjacent one side of said case when said case is in said first position;

said inclined means being inclined relative to a side wall of said case;

a guide rail carried adjacent a side wall of said case opposite from the side that said pair of inclined means are located;

means for moving said pair of spaced inclined means laterally towards said case so that one of said pair of inclined means engages a front corner of said case adjacent said front wall and the adjacent side wall and the other of said inclined means engaging said rear corner of said case adjacent rear wall and the adjacent side wall shifting said case from said first position rearwardly and sideways to a centered position wherein the center of said case is in vertical alignment with the center of said article loading device;

said means for moving said pair of spaced inclined means laterally also causes said inclined means to shift said leading case laterally into engagement with said guide rail.

2. The apparatus as set forth in claim 1 wherein said means for moving said pair of spaced inclined means comprises:
 a fluid-operated cylinder,
 a movable piston operably carried by said cylinder,
 means for activating said cylinder responsive to a case being fed to said first position causing said piston to be moved in said cylinder, and
 means for transferring the movement of said piston to said pair of spaced inclined arms.

3. A case centering apparatus for ensuring that each case being fed from a line of cases is positioned at a predetermined centered location relative to an article handling machine, each case having a front and rear wall joined by side walls, defining corners of said case, conveyor means delivering said cases longitudinally in sequence to adjacent said article handling machine, and means for stopping the leading case adjacent said case centering apparatus, said case centering apparatus comprising:
 a pair of arms carried adjacent one side of said case and extending outwardly from a phantom line which is in alignment with the desired longitudinal center of a case when located at said predetermined centered location,
 inclined surface means carried on the outer ends of said arms for projecting beyond said front and rear walls of said case,
 said surfaces being inclined relative to a side wall of said case,
 a guide rail carried adjacent a side wall of said leading case opposite from the side that said pair of arms are located,
 means for shifting said pair of arms laterally relative to said leading case wherein said inclined surfaces engage said front and rear corners on the same side of said case laterally and longitudinally shifting said leading case and longitudinally centering said case on said phantom line,
 said means for shifting said pair of arms laterally also causes said inclined surfaces to shift said leading case laterally into engagement with said guide rail.

4. The apparatus as set forth in claim 3 further comprising:
 means for connecting said pair of arms to form a pair of tongs, and
 said means for shifting said pair of arms laterally including:
  (i) a power operated cylinder connected to said tongs for selectively opening and closing said tongs upon being activated and deactivated, and
  (ii) means for selectively activating said power operated cylinder closing said tongs and centering said leading case on said phantom line.

5. An apparatus for centering cases of different lengths below an article loading machine so that articles carried above said case can be deposited in said case, said case having front and rear walls joined by side walls, said case having corners at the junctions of said side walls and said front and rear walls, said apparatus comprising:
 means for feeding said case longitudinally to said article loading machine and to a position below said articles to be deposited,
 stop means arresting said case at a first position below said loading machine,
 guide arm means carried adjacent one side of said case when said case is in said first position,
 said guide arm means including a pair of longitudinally spaced inclined surfaces with each surface provided for engaging one of said corners,
 said inclined surfaces being inclined relative to a side wall of said case,
 a guide rail carried adjacent a side wall of said case opposite from the side that said pair of inclined surfaces are located,
 means for moving said pair of inclined surfaces laterally toward the case to engage with said surfaces said case on the corner adjacent said front wall and side wall and on the corner adjacent said rear wall and said side wall laterally and longitudinally shifting said case from said first position to a position wherein said case is longitudinally centered relative to said articles carried on said article loading machine, said movement accommodating cases of different lengths,
 said means for shifting said pair of arms laterally also causes said inclined surfaces to shift said leading case laterally into engagement with said guide rail.

* * * * *